(12) United States Patent
Burns et al.

(10) Patent No.: US 11,117,657 B2
(45) Date of Patent: Sep. 14, 2021

(54) AERONAUTICAL APPARATUS

(71) Applicant: Aerhart, LLC, Malibu, CA (US)

(72) Inventors: Kevin Burns, Malibu, CA (US); Diana Brehob, Dearborn, MI (US)

(73) Assignee: Aerhart, LLC, Malibu, CA (US)

(*) Notice: Subject to any disclaimer, the term of this patent is extended or adjusted under 35 U.S.C. 154(b) by 257 days.

(21) Appl. No.: 16/027,290

(22) Filed: Jul. 4, 2018

(65) Prior Publication Data
US 2019/0225332 A1    Jul. 25, 2019

(51) Int. Cl.
| | |
|---|---|
| *B64C 27/605* | (2006.01) |
| *B64C 29/00* | (2006.01) |
| *B64C 39/02* | (2006.01) |

(52) U.S. Cl.
CPC ........ *B64C 29/0033* (2013.01); *B64C 39/024* (2013.01); *B64C 2201/02* (2013.01); *B64C 2201/14* (2013.01); *B64C 2201/165* (2013.01)

(58) Field of Classification Search
CPC ............. B64C 29/0033; B64C 39/024; B64C 2201/14; B64C 39/08; B64C 27/80
See application file for complete search history.

(56) References Cited

U.S. PATENT DOCUMENTS

| | | | |
|---|---|---|---|
| 4,856,736 A | 8/1989 | Adkins et al. | |
| 5,758,844 A * | 6/1998 | Cummings | ......... B64C 29/0033 244/12.4 |

(Continued)

FOREIGN PATENT DOCUMENTS

| | | |
|---|---|---|
| EP | 3263456 B1 | 3/2018 |
| JP | 2018030384 A | 3/2018 |

(Continued)

OTHER PUBLICATIONS

Ripmax Transition VTOL Assembly Instructions, http://www.ripmax.com/Instructions/a-rmx200.pdf, last visited Jul. 2, 2018.

(Continued)

*Primary Examiner* — Brian M O'Hara
*Assistant Examiner* — Keith L Dixon
(74) *Attorney, Agent, or Firm* — Diana D. Brehob; Brehob Law, PLLC

(57) ABSTRACT

An aeronautical apparatus is disclosed that has two pairs of wings. Each wing has a thrust-angle motor. A propeller and propeller motor are coupled to each thrust-angle motor. Propeller pitch is controlled by a propeller-pitch motor. The thrust-angle motor allows the propeller axis of rotation to be parallel to the fuselage's longitudinal axis; vertical (perpendicular to longitudinal axis, as in well-known fixed-position, four-propeller drones); and any position between as well as a given range exceeding these bounds which is used for control. An electronic control unit is electronically coupled to the thrust-angle motors, propeller motors, and propeller-pitch motors, which can be independently controlled, to provide the desired thrust and trajectory. Such an apparatus can provide efficient operation in vertical take-off/landing (hovering) and forward (translational) flight modes. Control surfaces, such as ailerons, which are provided on airplanes, are unnecessary due to the many degrees of freedom in control.

20 Claims, 9 Drawing Sheets

(56) References Cited

U.S. PATENT DOCUMENTS

| | | | |
|---|---|---|---|
| 9,561,849 B2 | 2/2017 | Welsh | |
| 9,650,134 B2 | 5/2017 | Chappell | |
| 10,252,797 B2* | 4/2019 | Vondrell | B64C 3/32 |
| 10,301,016 B1* | 5/2019 | Bondarev | B64C 9/12 |
| 10,773,802 B2 | 9/2020 | Finlay et al. | |
| 2011/0315809 A1* | 12/2011 | Oliver | B64D 27/12 |
| | | | 244/12.4 |
| 2012/0234968 A1* | 9/2012 | Smith | B64D 17/64 |
| | | | 244/12.3 |
| 2015/0314865 A1 | 11/2015 | Bermond | |
| 2015/0344134 A1* | 12/2015 | Cruz Ayoroa | B64C 39/12 |
| | | | 244/48 |
| 2017/0144771 A1* | 5/2017 | Lukaczyk | B64C 39/024 |
| 2017/0274996 A1 | 9/2017 | Frolov et al. | |
| 2017/0313410 A1 | 11/2017 | Ismagilov et al. | |
| 2018/0141655 A1* | 5/2018 | Wall | B64C 29/0033 |
| 2018/0215465 A1* | 8/2018 | Renteria | B64C 27/02 |
| 2018/0281941 A1* | 10/2018 | Hutson | B64C 5/02 |
| 2018/0346111 A1* | 12/2018 | Karem | B64C 27/80 |
| 2019/0176981 A1* | 6/2019 | Gaillimore | B64C 29/04 |

FOREIGN PATENT DOCUMENTS

| | | |
|---|---|---|
| KR | 20040018614 A | 3/2004 |
| KR | 20170135577 A | 12/2017 |

OTHER PUBLICATIONS

Graupner Online Shop-Productinformation, http://shop.graupner.de/webuerp/AI?ARTN=9944.RTF., last visited Mar. 26, 2018.

Graupner X44 Manual, https://www.graupner.de/media/pdf/d4/aa/e2/99445a31137c08dc3.pdf, last visited Jul. 2, 2018.

Graupner X44 Webpage, http://shop.graupner.de/webuerp/AI?ARTN=9944.RTF&SessionCheck=4711&language=en, last visited Mar. 22, 2018.

The Tri Rotor Drone_Why Has It Been Overlooked, Hackaday, https://hackaday.com/2017/05/26/the-tri-rotor-drone-why-has-it-been-overlooked/, last visited May 22, 2018.

Youtube video: https://www.youtube.com/watch?v=gPEeCjVrTBw&feature=youtu.be last viewed Oct. 9, 2019.

한국항공우주연구원 .pdf last viewed Oct. 9, 2019. (Korean Aerospace Research Institute, UAV R&D).

Bell Boeing Quad TiltRotor—Wikipedia.pdf last viewed Oct. 9, 2019.

"Numerical Investigation for the Longitudinal Stability of the Quad Tilt Propeller UAV," Lee, Y., Choi, J., and Kim, C. Tenth International Conference on Computational Flud Dynamics (ICCFD10), Barcelona, Spain, Jul. 9-13, 2018.

Quad TiltRotor (QTR) aircraft development, New Atlas, Sep. 24, 2005.

International Search Report for PCT/US2019/040657 dated Oct. 29, 2019, 3 pages.

English language abstract and machine-assisted English translation for JP2018030384 extracted from Espacenet.com database on Oct. 30, 2019, 19 pages.

English language abstract and machine-assisted English translation for KR20040018614 extracted from Espacenet.com database on Oct. 30, 2019, 8 pages.

English language abstract and machine-assisted English translation for KR20170135577 extracted from Espacenet.com database on Oct. 30, 2019, 16 pages.

* cited by examiner

AERONAUTICAL APPARATUS

FIELD

The present disclosure relates to vertical take-off and landing (VTOL) aircraft, in particular aeronautical vehicles, commonly referred to as unmanned aerial vehicles (UAVs) or drones.

BACKGROUND

UAVs, more commonly called drones, particularly for aerial reconnaissance and small package delivery, are presently often covered by the press and are being designed and built by many researchers and developers. Such drones are typically powered by onboard batteries. One of the significant hurdles to overcome is range limitation due to the well-understood tradeoff between including more batteries to extend range, and the additional weight of those batteries requiring more lift, causing them to drain energy at a faster rate. Although the U in UAV stands for unmanned, the present disclosure applies to aeronautical vehicles that include passengers and/or crew. Herein, UAV and drone both refer to manned or unmanned aeronautical vehicles.

Drones for many purposes are VTOL devices. A common prior-art drone 10 configuration, as shown in FIG. 1, has a body 12 with four arms 14 extending outwardly in a plane, approximately evenly radially displaced. Each arm has a propeller motor housed within a nacelle 16. The propeller motor (not visible in FIG. 1) drives a propeller 18. The propellers are arranged to provide an upward thrust to drone 10 by pushing air downward in a direction that gravity nominally acts, as indicating by arrow 20. Drone 10 has landing feet 22.

A drone, such as the one shown in FIG. 1, takes-off, lands, hovers or adjusts its altitude by applying equal power to all propeller motors; adjusts its yaw rate by applying more power to propeller motors rotating in one direction and/or less to the ones rotating in the opposite direction; and adjusts its pitch or roll rates by applying more power to certain propeller motors and less power to those diametrically opposite. Thrust is varied by varying propeller speed in response to propeller motor power. The drone of FIG. 1 is a simple, light-weight device that hovers, takes-off, and lands well. However, in terms of energy, is inefficient. It has no airfoils that provide lift, thus the propellers provide the upward thrust to keep the drone inefficiently aloft as well as provide thrust for forward motion. In level flight, the direction of gravity is substantially normal to the plane in which the four arms 14 sit. To maneuver forward (or other maneuvers perpendicular to the direction of gravity), the drone is angled slightly by differing the power of diametrically opposite propeller motors so that the imbalance causes the direction of gravity to no longer be substantially normal to the plane in which the four arms sit.

A prior-art drone 30 that overcomes some of the disadvantages associated with the type of drone illustrated in FIG. 1 is shown in FIG. 2. Drone 30 has a fuselage 32 and four wings: right aft, left aft, right fore, and left fore. At tips of wing 34, a propeller motor is coupled. The propeller motor is not separately visible because it is housed within a nacelle 36. The propeller motors drive propellers 38. A thrust-angle position (which is to say an angle that the axis of rotation of a propeller or propeller motor makes with a longitudinal axis of a fuselage) of propellers 38, in FIG. 2, is shown in an intermediate thrust-angle position between a hovering thrust-angle position and a translational flight thrust-angle position. Propellers 38 (and propeller motors) of FIG. 2 can change their thrust-angle position to a hovering thrust-angle position similar to propellers' 18 thrust-angle position of FIG. 1. In FIG. 1, blades of propellers 18 rotate in a plane substantially parallel with the geometric plane in which arms 14 are located. Or stated another way, the axis of rotation of propellers 18 is substantially parallel to arrow 20 in level flight. Referring back to FIG. 2, the translational flight thrust-angle position of propellers 38 is what is the familiar thrust-angle position for a propeller-equipped airplane 50, as shown in FIG. 3. The airplane of FIG. 3 has a fuselage 52 with two wings 54 extending outward from fuselage 52. Wings 54 have engines 56 that drive propellers 58. The axis of rotation of engines 56 and propellers 58 is substantially parallel with the longitudinal axis of the fuselage. Referring back to FIG. 2, the axes of rotation of propellers 38 are about halfway between the axes of rotation of the propellers shown in FIGS. 1 and 3.

Not visible in FIG. 2 is a thrust-angle motor, i.e., motor that change the propeller motors' and propellers' 38 thrust-angle position between the hovering and translational flight thrust-angle positions. In drone 30 of FIG. 2, a single thrust-angle motor controls all propellers' thrust-angle positions synchronously, i.e., they are ganged together with their thrust-angle positions mechanically linked.

Drone 30 of FIG. 2 can take-off vertically, hover, and land vertically when propellers' 38 thrust-angle positions are in the hover thrust-angle position. When propellers' 38 thrust-angle positions are changed to like that of propellers 58 in FIG. 3, drone 30 is in translational flight. When in translational flight, wings 34 act as airfoils to provide lift. If the thrust-angle position of propellers 18 in FIG. 1 were to be similarly changed, there would be no lift produced and drone 10 would descend.

To control the trajectory of aeronautical apparatuses, such as drone 30 in FIG. 2 and airplane 50 in FIG. 3, there must be a number of control surfaces. Examples of such control surfaces are elevons 42 on drone 30 in FIG. 2. Airplane 50 in FIG. 3 has ailerons 60, elevators 62, and rudders 64. Such control surfaces penalize flight by increasing weight, drag and mechanical complexity of the aeronautical apparatus.

An aircraft or drone that has a high degree of control over trajectory and does so in a mechanically and energy efficient manner is desired.

SUMMARY

To overcome at least one of the disadvantages of the prior art, an aerodynamic apparatus is disclosed that provides at least one additional degree of freedom in controlling the propellers thrust-angle position so that much of the typically used control surfaces can be eliminated to reduce weight and drag while flying, thereby allowing for greater endurance, faster flight, and/or increased range per charge of the batteries, and doing so while only using hardware that is already in place to transition between hover and translational flight when airborne. Furthermore, mechanical complexity is reduced when control surfaces are eliminated.

An aeronautical apparatus is disclosed that includes: a fuselage having a longitudinal axis and a transverse axis; first and second wings coupled to a fore section of the fuselage at the same axial location as each other with the second wing being a mirror image of the first wing; third and fourth wings coupled to an aft section of the fuselage at the same axial location as each other but behind the axial location of the first and second wings with the fourth wing being a mirror image of the third wing; first, second, third, and fourth thrust-angle motors having an axis of rotation substantially parallel to the transverse axis of the fuselage with the first, second, third, and fourth thrust-angle motors coupled proximate a tip of the first, second, third, and fourth wings, respectively; and first, second, third, and fourth propeller motors coupled to the first, second, third, and fourth thrust-angle motors, respectively; and first, second, third, and fourth propellers coupled to the first, second, third, and fourth propeller motors, respectively.

A propeller assembly is comprised of a propeller coupled to a propeller motor.

Each thrust-angle motor controls the thrust-angle position of its associated propeller assembly.

In some embodiments, the first, second, third, and fourth wings are unitary, i.e., without control surfaces such as ailerons or elevons.

In some embodiments, the aeronautical apparatus also includes at least one stabilizer. It is typical, for example, for vertical stabilizers at the aft of an aircraft to have controllable rudders. In some embodiments of the present disclosure, a stabilizer, such as a vertical stabilizer is included, although as a non-controllable stationary vertical stabilizer, i.e., without a rudder.

The aeronautical apparatus also includes an electronic control unit (ECU).

The ECU is in electronic communication with the first, second, third and fourth thrust-angle motors. The ECU determines desired first, second, third, and fourth thrust-angle positions for the first, second, third, and fourth propeller assemblies, respectively, based at least on a desired trajectory. The ECU commands the first, second, third, and fourth thrust-angle motors to attain the desired first, second, third and fourth thrust-angle positions, respectively.

The ECU is in electronic communication with the first, second, third and fourth propeller motors. The ECU determines desired first, second, third, and fourth propeller speeds for the first, second, third and fourth propellers, respectively, based at least on the desired trajectory. The ECU commands the first, second, third, and fourth propeller motors to attain the desired first, second, third, and fourth propeller speeds, respectively.

The ECU determines actual trajectory of the aeronautical apparatus based on data from a sensor and determines desired trajectory of the aeronautical apparatus based on at least one input signal. The input signal, in some embodiments, is used to communicate a desired flight path, a desired maneuver, or a desired end point. In some embodiments, the input signal is updated during the flight, maybe in real time. In other embodiments the input signal is used only before flight. Commands to the first, second, third, and fourth thrust-angle motors and the first, second, third, and fourth propeller motors are based on the actual trajectory and the desired trajectory. The sensor comprises at least one of: air speed, ground speed, radar altimeter, barometric pressure, thermometer, magnetometer, global position, accelerometer, gyroscope, radar, LIDAR, sonar, infrared camera, visible wavelength camera, energy consumption rate, energy generation rate, and battery charge state.

In some embodiments at least two of the propellers are variable pitch having a propeller-pitch motor. Propeller-pitch angle (which is to say the angle the propeller blade makes with the plane of the propeller's rotation, or stated differently, the propeller blade's angle of attack in still air) is controlled by the propeller-pitch motor. In other embodiments, all the propellers have propeller-pitch motors.

The ECU is in electronic communication with the first and second propeller-pitch motors. The ECU determines the desired first and second propeller-pitch angles for the first and second propellers, respectively, based at least on the desired trajectory. The ECU commands the first and second propeller-pitch motors to attain the desired first and second propeller-pitch angles, respectively.

Thrust-angle positions are comprised of thrust-angle base positions that have a range of 90 degrees and thrust-angle control positions that have a range of at least 10 degrees. Thrust-angle control positions allow the aeronautical apparatus to be controllable about the yaw axis and in the longitudinal direction while hovering and controllable about the roll and pitch axes while in translational flight.

Propeller-pitch angles are comprised of propeller-pitch base angles and propeller-pitch control angles. Propeller-pitch control angles allow the aeronautical apparatus to be controllable about the roll and pitch axes while hovering and controllable about the yaw axis while in translational flight.

The ECU bases the desired first, second, third, and fourth thrust-angle positions, the desired first, second, third, and fourth propeller speeds and the desired first and second propeller-pitch angles on data from sensors. The sensors include at least one of: air speed, ground speed, radar altimeter, barometric pressure, thermometer, magnetometer, global position, accelerometer, gyroscope, radar, LIDAR, sonar, infrared camera, visible wavelength camera, energy consumption rate, energy generation rate, and battery charge state.

The ECU obtains data on an actual trajectory for the aeronautical apparatus. The ECU computes a trajectory discrepancy based on a difference between the desired trajectory and the actual trajectory. The ECU computes updated first, second, third, and fourth thrust-angle positions; first, second, third and fourth propeller speeds; and first and second propeller-pitch angles based on the trajectory discrepancy. The ECU commands first, second, third, and fourth thrust-angle motors; first, second, third and fourth propeller motors; and first and second propeller-pitch motors to attain the updated first, second, third and fourth thrust-angle positions; first, second, third and fourth propeller speeds; and the first and second propeller-pitch angles, respectively.

The fore wings are angled downward with anhedral, and the aft wings are angled upward with dihedral, where the aft wings have a larger projected area than the fore wings. Landing feet provided near the tips of the fore wings touch the ground before the fuselage would touch the ground due to the anhedral wings.

The first and second wingtips are below the transverse axis by the same amount that the third and fourth wingtips are above the transverse axis. The first and second thrust-angle motor are coupled to the first and second wingtips respectively such that the first and second propeller motors (which are coupled to the first and second thrust-angle motors, respectively) are the same distance below the transverse axis that the third and fourth propeller motors (which are coupled to the third and fourth thrust-angle motors which are in turn coupled to the third and fourth wingtips, respectively) are above the transverse axis, and, the first and second propeller motors are in front of the transverse axis by the same amount that the third and fourth propeller motors are behind the transverse axis.

The aeronautical apparatus also has at least one stabilizer coupled to the fuselage and extending downwardly from the fuselage. A tip of the first wing, a tip of the second wing, and the stabilizer support the aeronautical apparatus when on the ground.

Also disclosed is an aeronautical apparatus with a fuselage having a longitudinal axis and a transverse axis; a first wing coupled to a right side of the fuselage; a second wing coupled to a left side of the fuselage; first and second thrust-angle motors having an axis of rotation substantially parallel to the transverse axis of the fuselage with the first and second thrust-angle motors coupled proximate a tip of the first and second wings, respectively; a first propeller motor coupled to the first thrust-angle motor; a second propeller motor coupled to the second thrust-angle motor; a first propeller coupled to the first propeller motor; and a second propeller coupled to the second propeller motor.

The aeronautical apparatus includes a third propeller motor coupled to the fuselage; and a third propeller coupled to the third propeller motor.

Some embodiments of the aeronautical apparatus include: a third wing coupled to a right side of the fuselage; a fourth wing coupled to a left side of the fuselage; third and fourth thrust-angle motors having an axis of rotation substantially parallel to the transverse axis of the fuselage with the third and fourth thrust-angle motors coupled proximate a tip of the third and fourth wings, respectively; a third propeller motor coupled to the third thrust-angle motor; a fourth propeller motor coupled to the fourth thrust-angle motor; a third propeller coupled to the third propeller motor; and a fourth propeller coupled to the fourth propeller motor.

In some embodiments at least two of the propellers are variable pitch having propeller-pitch motors. Propeller-pitch angle is controlled by the propeller-pitch motors. In other embodiments, all the propellers have propeller-pitch motors.

The aeronautical apparatus includes an ECU in electronic communication with the first and second thrust-angle motors, first and second propeller motors, and first and second propeller-pitch motors. The ECU commands thrust-angle positions to the first and second thrust-angle motors, propeller speeds to the first and second propeller motors, and propeller-pitch angles to first and second propeller-pitch motors based at least on a desired trajectory.

The aeronautical apparatus includes a plurality of sensors in electronic communication with the ECU. The ECU commands to the first and second thrust-angle motors, first and second propeller motors and first and second propeller-pitch motors are further based on data from the plurality of sensors.

The aeronautical apparatus includes a stabilizer extending downwardly from the fuselage. When on the ground, the aeronautical apparatus is supported by a wingtip of the first wing, a wingtip of the second wing, and the stabilizer.

According to embodiments disclosed herein, inefficient flying configurations are avoided and components that increase drag are omitted as their function is supplanted by the high degree of control over the aeronautical apparatus afforded by individual control of thrust-angle position of the propellers via thrust-angle motors, speed of the propellers, and pitch of propeller blades, depending on the embodiment.

When hovering, lift is provided solely by the action of the propellers. When in translational flight, lift is provided solely by the wings. Of course, to obtain lift using wings, the aeronautical apparatus must be moving through the air. The power required to drive the propellers during translational flight while maintaining the same lift is less than the power required to drive the propellers while hovering. To improve endurance, it is useful to switch to translational flight as soon as practical. Additionally, for some hovering operations, it may be suitable to translate in a small radius ellipse for pseudo hovering at greater efficiency than a true hover. The aeronautical apparatus disclosed herein is particularly suitable for drone applications in which much of the flight plan includes translation due to the significant energy savings, which equates to greater endurance, that such a drone affords. Furthermore, the greater endurance provided by translational flight increases the range of such a drone by allowing it to remain airborne longer. Also, it is necessary for the minimum airspeed to be higher for translational flight when compared to hovering, and this higher speed coupled with the ability to remain airborne longer compounds the effects on range increasing it even further.

DETAILED DESCRIPTION

As those of ordinary skill in the art will understand, various features of the embodiments illustrated and described with reference to any one of the Figures may be combined with features illustrated in one or more other Figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations. Those of ordinary skill in the art may recognize similar applications or implementations whether or not explicitly described or illustrated.

Figure 4:
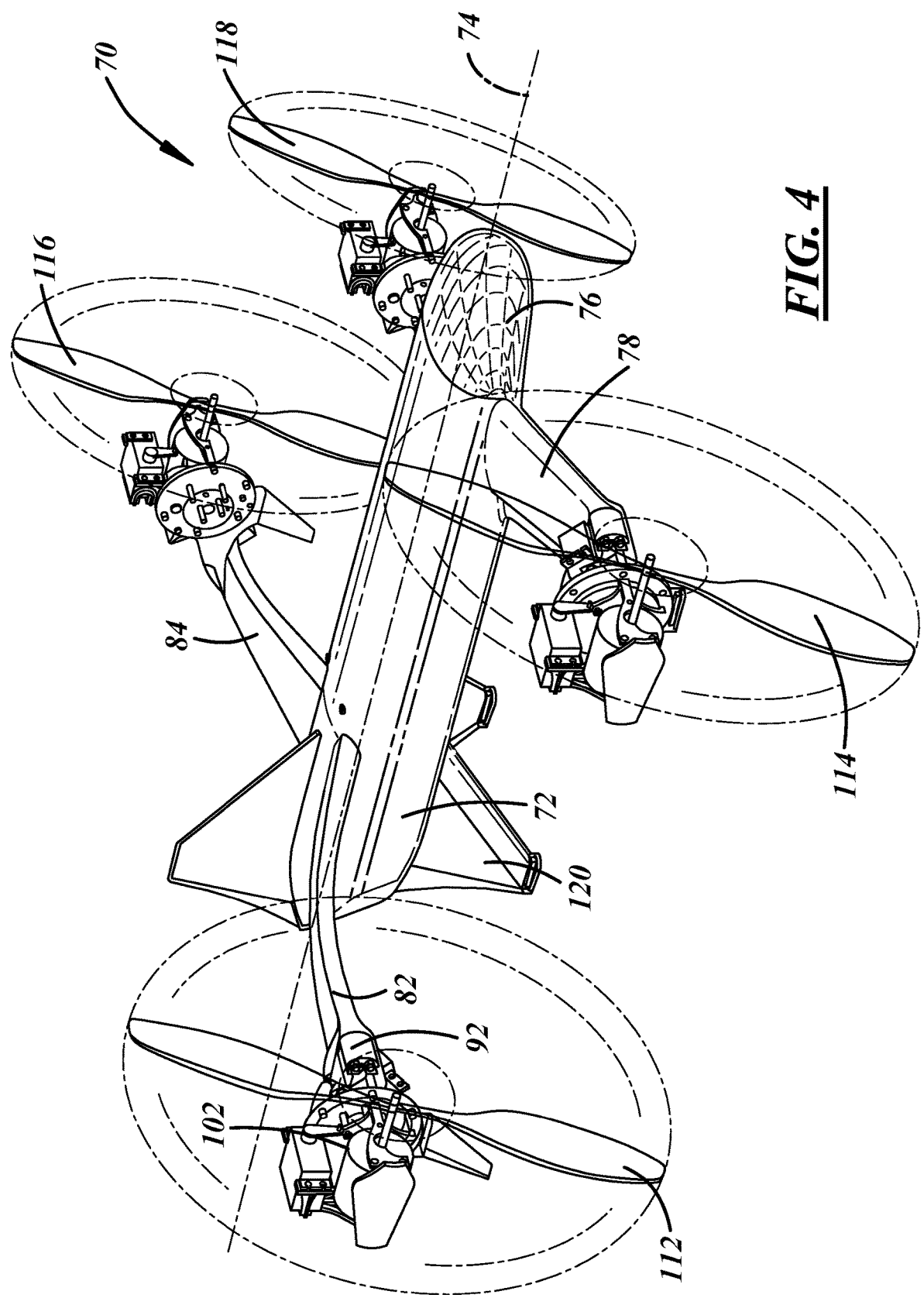
FIGS. 4 and 6 are isometric views of aerodynamic apparatuses according to embodiments of the present disclosure.

In FIG. 4, an isometric view of an aeronautical apparatus (UAV or drone) 70 is shown. Drone 70 has a fuselage 72 with a nose 76 at its fore. Fuselage 72 has a longitudinal axis 74. Four wings are coupled to fuselage 72: right fore 78, left fore (not visible), right aft 82, and left aft 84. In the embodiment in FIG. 4, fore wings are attached to fuselage 72 located below longitudinal axis 74 (or below a plane that includes longitudinal axis 74 and which the direction of gravity is normal to) with anhedral (wings pointing downward); and aft wings are attached to fuselage 72 above longitudinal axis 74 (or above a plane that includes longitudinal axis 74 and which the direction of gravity is normal to) with dihedral (wings pointing upward).

Figure 5:
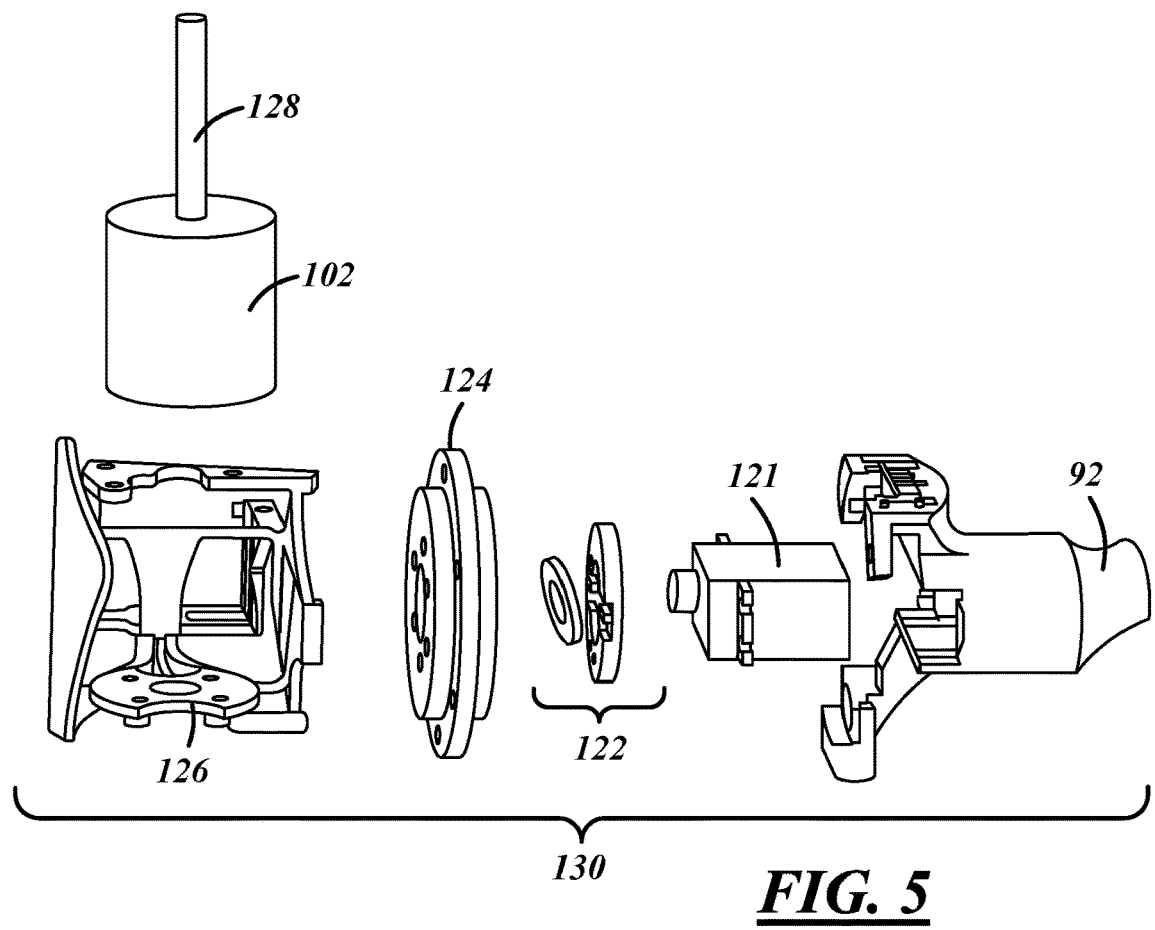
FIG. 5 is an exploded view of an embodiment of a propeller motor coupled to a thrust-angle motor coupled to a wingtip.

Coupled to a tip of right aft wing 82 in FIG. 4 is a thrust-angle motor (not visible) which is contained within a tip 92 of wing 82. A propeller motor 102 is coupled to the thrust-angle motor (not shown) within tip 92 and a propeller 112 is coupled to propeller motor 102. Assembly 130 of FIG. 5 shown in an exploded view are provided at the tips of each of the wings: right fore, right aft, left fore, and left aft, with those on the left being of a mirror-image configuration. In FIG. 5, an exploded view illustrates that a thrust-angle motor 121 is coupled to tip 92 of a wing (not shown). A slewing ring 124 has an adapter 122 provided between thrust-angle motor 121 and slewing ring 124. Typically, propeller motor 102 is contained within a nacelle (a streamlined housing), not shown in FIG. 5. An adaptor 126 is provided between slewing ring 124 and propeller motor 102. Coupled to propeller motor 102 is shaft 128. Propeller blades (not shown) are mounted on shaft 128.

Figure 6:
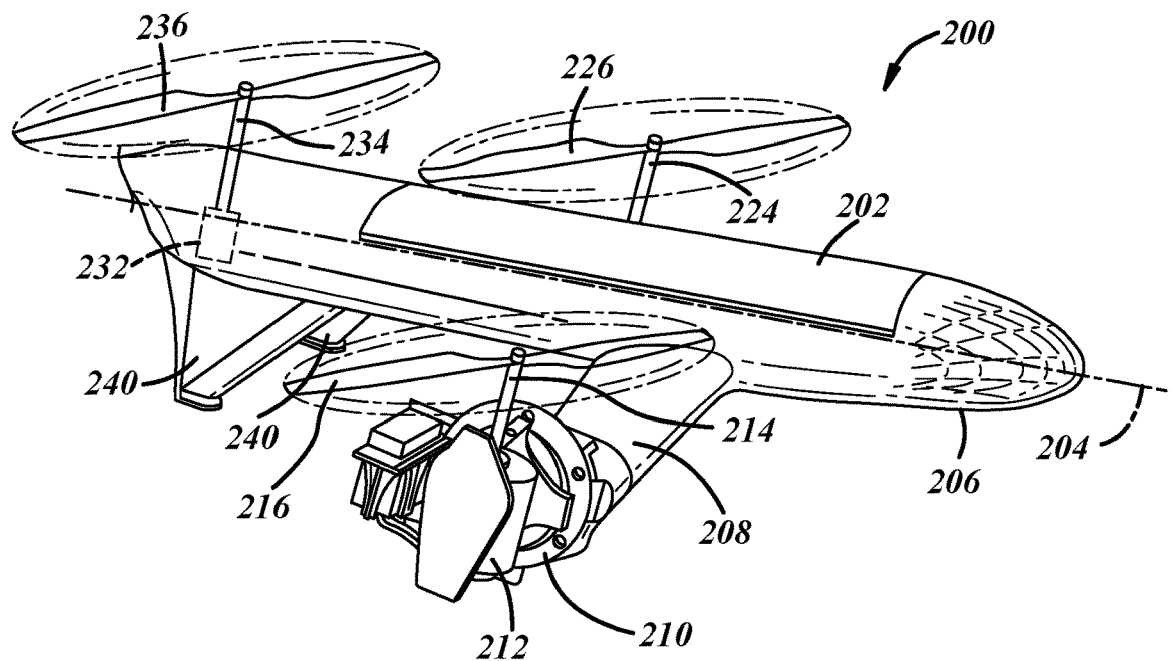

An alternative configuration of an aeronautical apparatus (drone) 200, is shown in FIG. 6. Drone 200 has a fuselage 202 that has a longitudinal axis 204 and a nose 206 at its fore. A right wing 208 is equipped with a thrust-angle motor (not shown) driving a slewing ring 210. Thrust-angle motor is coupled to a propeller motor 212 via the slewing ring 210 to change the thrust-angle position of propeller motor 212 (an assembly similar to assembly 130 of FIG. 5 is provided on each of the right and left wings, but mirror on the left). Propeller motor 212 is shown with an axis of rotation that is substantially perpendicular with longitudinal axis 204 and parallel with the direction gravity acts in level flight, which is a thrust-angle position for take-off, hovering and landing. The axis of rotation of propeller motor 212 can be positioned such that it is substantially parallel with longitudinal axis 204 for translational flight. Propeller motor 212 is coupled to shaft 214 to which a propeller 216 is mounted. The wing assembly (208, 210, 212, 214, 216, and the thrust-angle motor which is not visible) on the right side of fuselage 202 is provided on the left side of fuselage 202, although in a mirror-image configuration. The only parts of the left-wing assembly visible in FIG. 6 are shaft 224 and a propeller 226. A third propeller assembly is provided on fuselage 202. A propeller motor 232 housed within fuselage 202 is shown in phantom. Propeller motor 232 drives shaft 234 that has a propeller 236 mounted thereto. Propeller motor 232 is fixed, meaning that it does not have a thrust-angle motor. In some embodiments, it is provided with a propeller-pitch motor that changes the propeller-pitch angle of the blades. Propeller 236 is utilized primarily during take-offs, landings, and hovering. In some embodiments propeller motor 232, shaft 234 and propeller 236 are placed in front of right wing 208 and left wing (not visible) on the fuselage 202. During translational flight, propeller motor 232 is deactivated and propeller 236 presumably assumes a configuration in which the blades are substantially parallel with longitudinal axis 204. Propeller 236 becomes drag during forward flight. To avoid significant drag, propeller 236 has two blades that can assume a fore and aft configuration when in forward flight. In alternative embodiments, propeller 236 may have other blade numbers and configurations.

Figure 7:
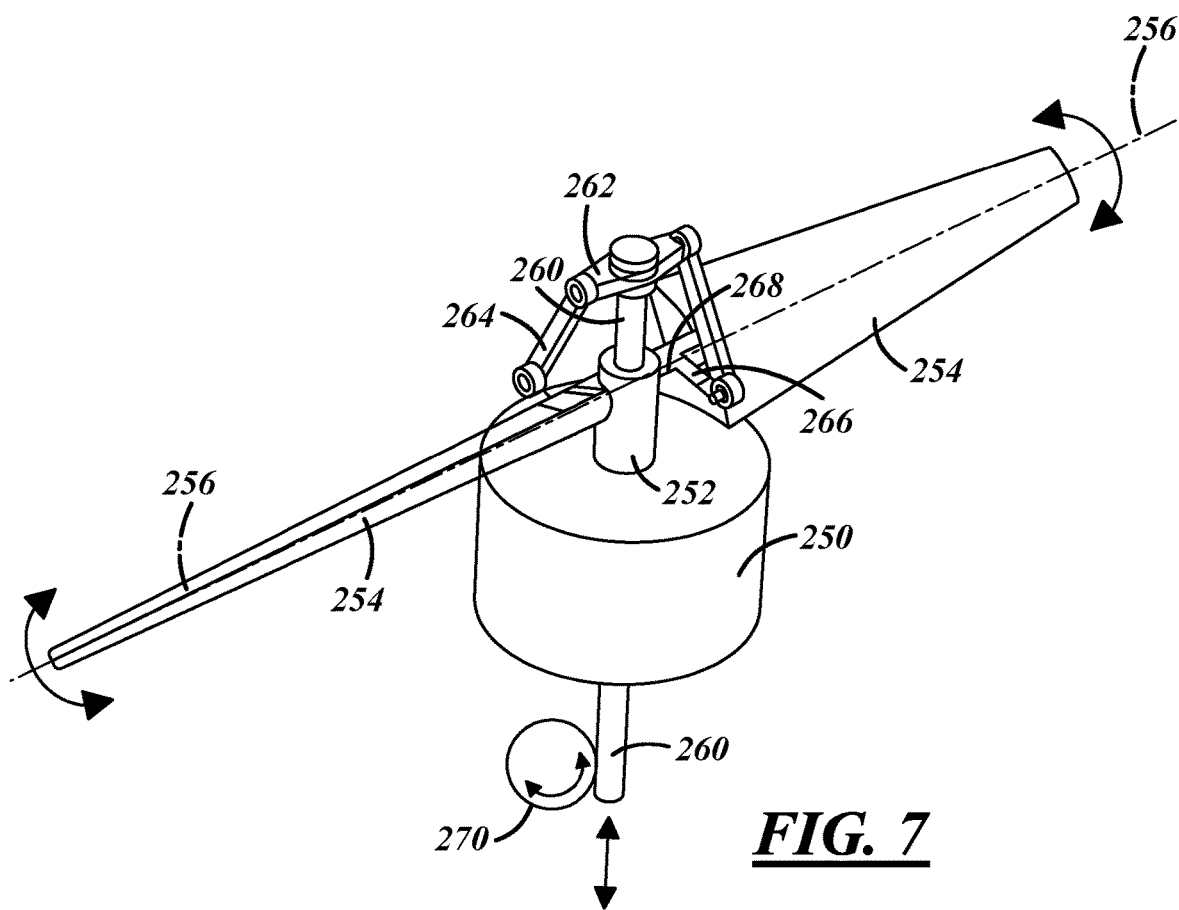
FIG. 7 is an embodiment of a mechanism to adjust pitch of the blades of a propeller.

As described above, some embodiments include mechanisms to change the pitch of the blades of the propeller, such as that shown in FIG. 7. A propeller motor 250 has a propeller motor output shaft 252 to which propeller blades 254 are coupled. Propeller motor output shaft 252 is hollow to allow a control shaft 260 to extend there through. Control shaft 260 is attached to a yoke 262. Yoke 262 has pins at its periphery that engage with control links 264. There is one pin and one control link per propeller blade. Control links 264 couple to yoke 262 at one end and at a bell crank 266 attached to the root of the propeller blades 254 at the other. Propeller blades 254 have a centerline 256. Control links 264 couple to bell crank 266 away from the centerline 256 so that when control links are moved, blade 254, which is attached to bell crank 266, rotates around a propeller drive shaft 268. Propeller drive shaft 268 is integrally formed with propeller motor output shaft 252 in the example shown in FIG. 7. When control shaft 260 is pulled downward, propeller blades 254 rotate around centerline 256; when control shaft 260 is pushed upward, propeller blades 254 rotate about centerline 256 in an opposite direction of that when shaft 260 is pulled downward. Rotation of an actuator 270 causes linear motion of control shaft 260. The mechanism for changing pitch of propeller blades shown in FIG. 7 is not intended to be limiting and is simply one example of a pitch control actuator.

Figure 1:
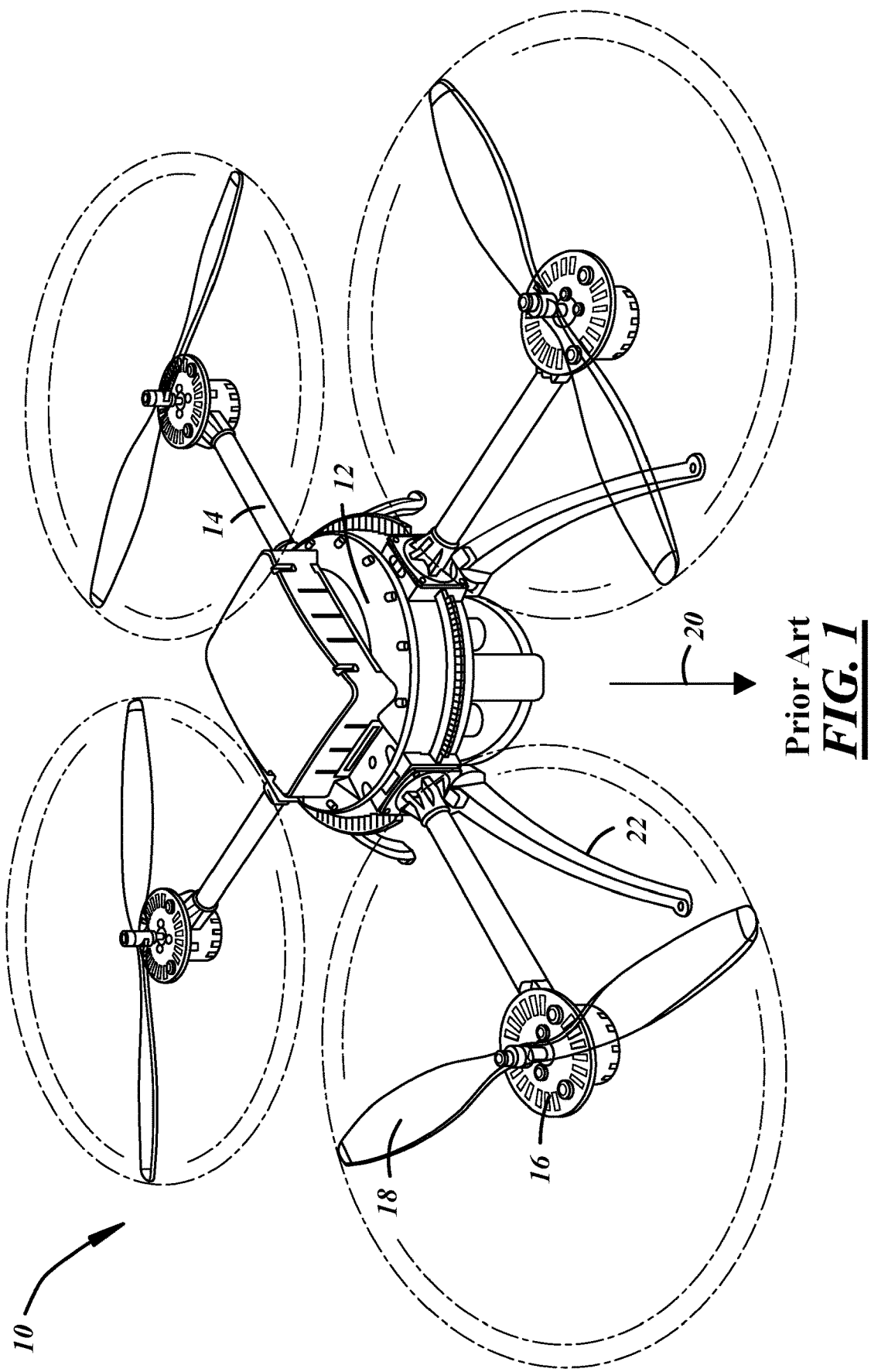
FIG. 1 is an illustration of a prior-art, four-propeller drone in which the propeller motors and thus propellers' axes of rotation are at a fixed thrust-angle position with respect to the body of the drone.
Figure 2:
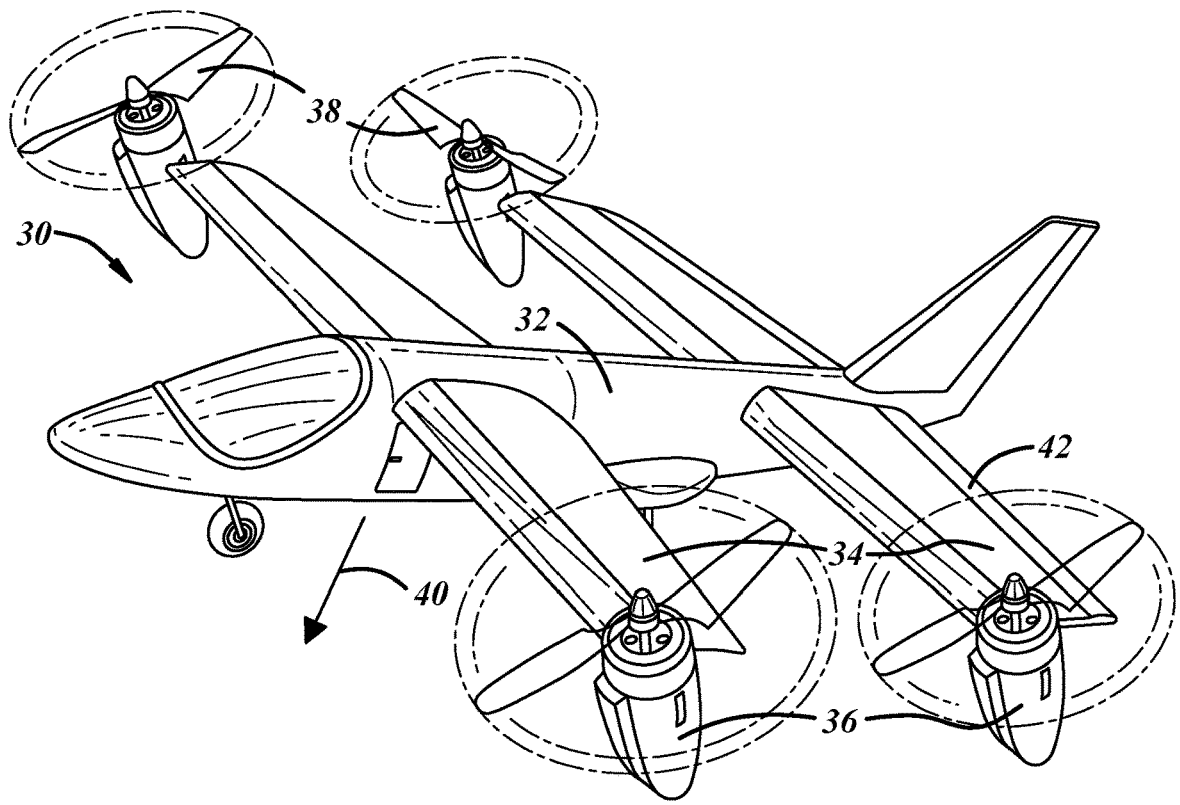
FIG. 2 is an illustration of a prior-art, four-propeller aeronautical apparatus with wings for providing lift during translational flight and a thrust-angle motor to change the thrust-angle positions of the propeller motors and propellers.
Figure 3:
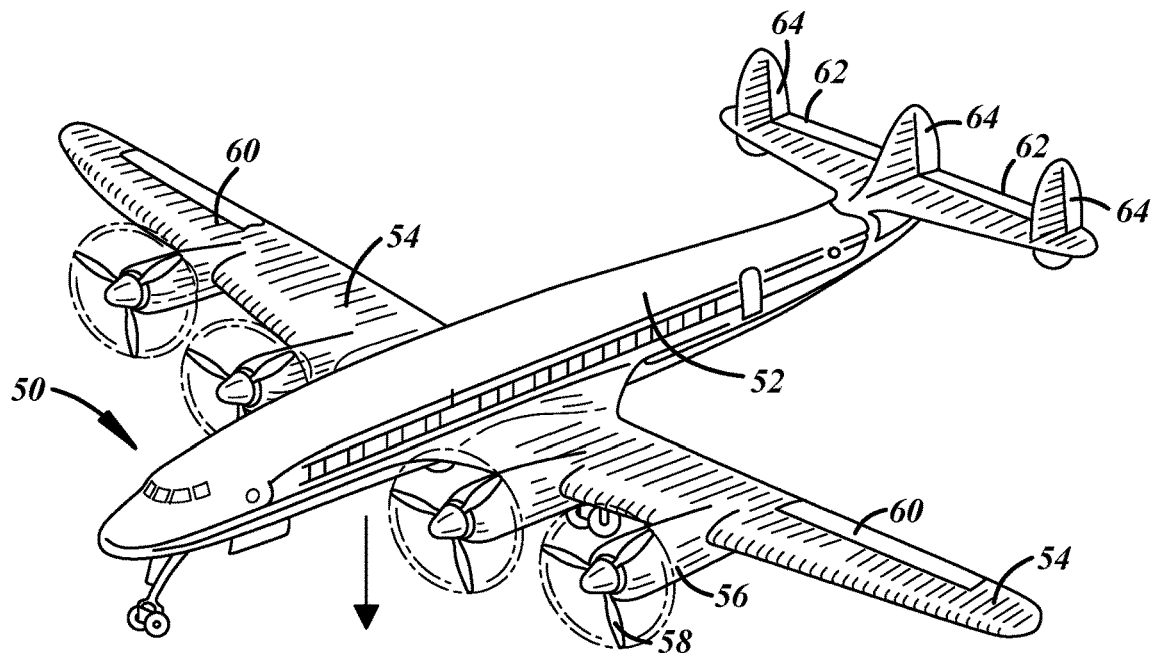
FIG. 3 is an illustration of an airplane with the propellers' thrust-angle position fixed in translational flight.
Figure 8:
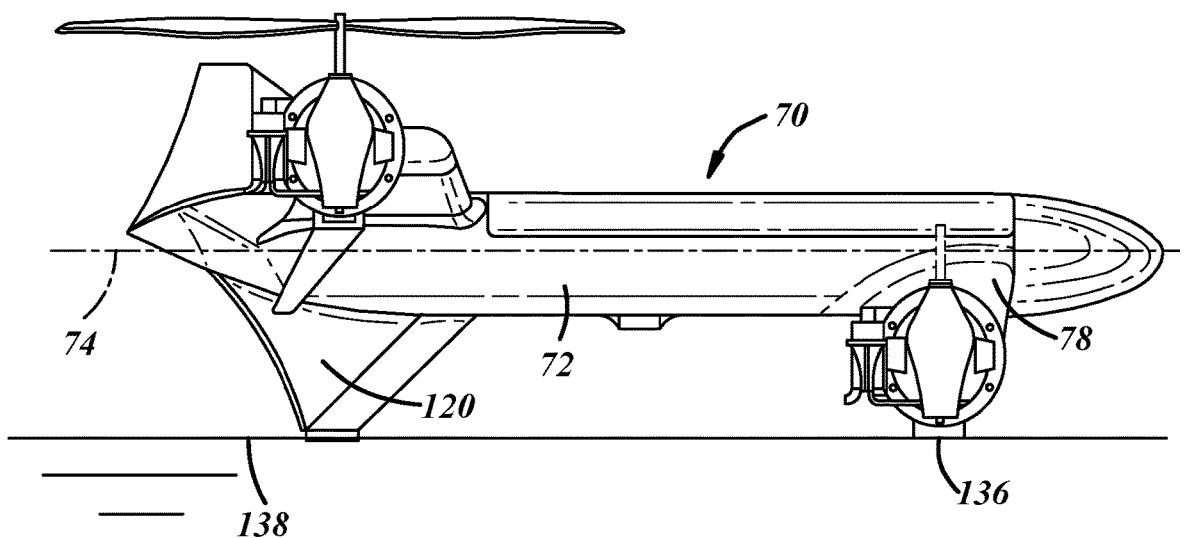
FIG. 8 is a side view of the aeronautical apparatus of FIGS. 4 and 6 resting on the ground.

Airplanes have landing gear. An aeronautical device with hovering capability need not have wheels for landing gear, instead, just stable surfaces. A side view of drone 70 on the ground 138 is shown in FIG. 8. The right fore wing 78 is partially visible in FIG. 8. Associated with the tip of wing 78 is a landing foot 136. Both right fore wing 78 and left fore wing (not visible in FIG. 8) have such a landing foot. In some embodiments, there are two stabilizers 120 that rest on ground 138. In alternative embodiments, only one stabilizer is provided at the aft with drone 70 resting on two landing feet 136 and stabilizer 120 in a triangular formation. Drone 70 has the right fore wing 78 and the left fore wing (not visible) coupled to the aircraft at a lower point on the fuselage 72. Because the axes of rotation of propellers 112, 114, 116, and 118 of FIG. 4 can be positioned such that they are parallel to the direction of gravity, propellers 112, 114, 116, and 118 of FIG. 4 do not run the danger of hitting the ground 138 of FIG. 8 and causing damage or throwing drone 70 out of its desired attitude. Drone 70 has an advantage in that stabilizer 120 and tip of right fore wing 78 and tip of left fore wing (not visible in FIG. 8) double as landing feet, presenting a minimal increase in weight and drag, particularly when compared to the prior-art landing wheels, such as those shown in FIGS. 2 and 3.

Figure 9:
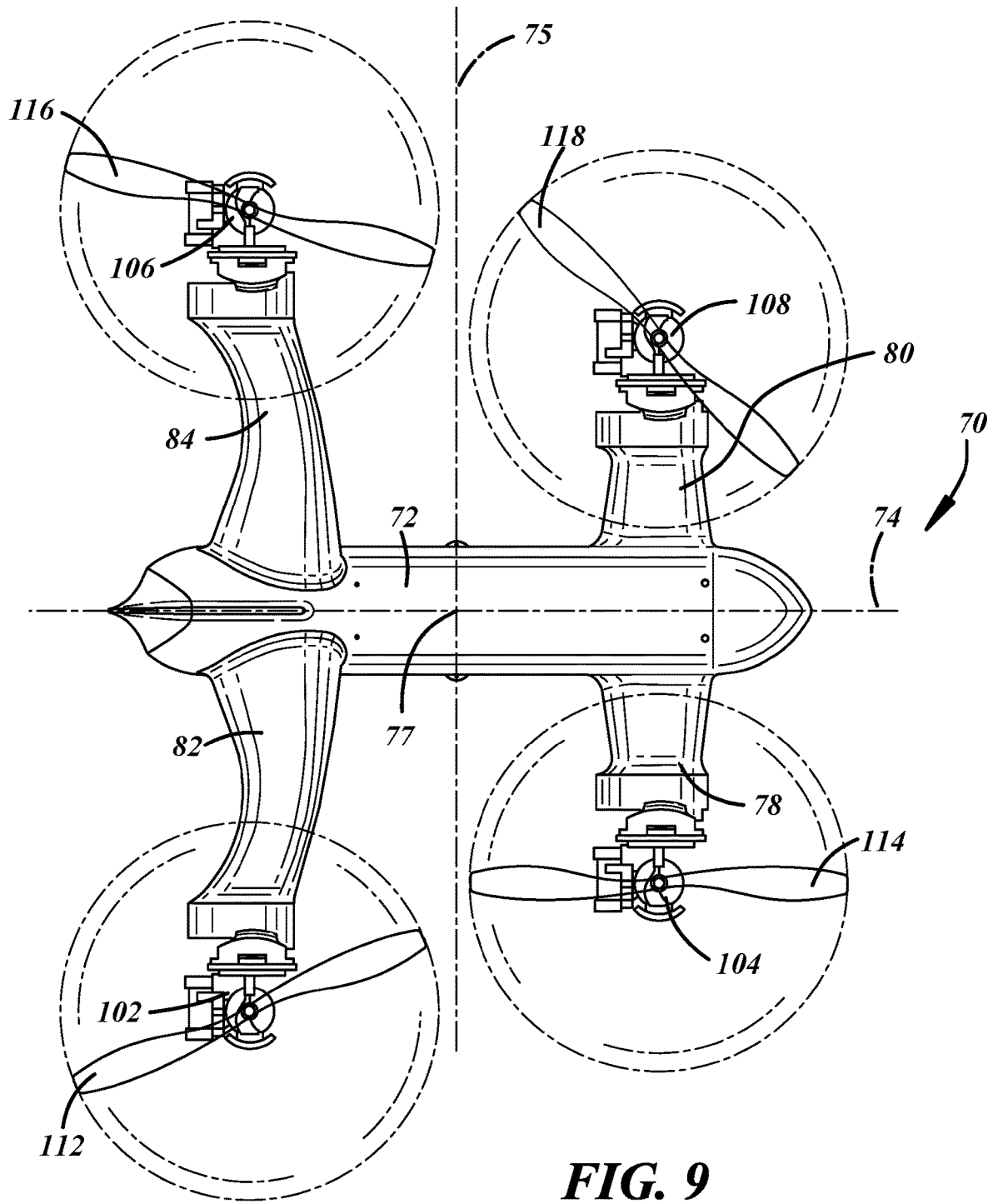
FIG. 9 is a plan view of the aeronautical apparatus of FIGS. 4 and 8.

In FIG. 9, a plan view of drone 70 is shown. Both the longitudinal axis 74 and a transverse axis 75 are shown. The center of mass 77 is located at the intersection of axes 74 and 75. Fore wings 78 and 80 are shorter than aft wings 82 and 84. It is desirable for the center of mass 77 of drone 70 to be at the center of lift while hovering and ahead of the center of lift while in translational flight. Stated another way, it is desirable for the center of mass 77 to be longitudinally equidistant between the fore and aft propeller's axis of rotation and laterally (transversely) equidistant between the left and right propeller's axis of rotation while hovering, and directly ahead of the aerodynamic center while in translational flight. While hovering, lift is provided by propellers 112, 114, 116, and 118 only. Thus, the location of the propellers 112, 114, 116, and 118 is such that the centroid of the propellers 112, 114, 116, and 118 is substantially coincident with the center of mass 77. In translational flight, wings 78, 80, 82, and 84 provide the lift. To make the aerodynamic center behind the center of mass 77 for stable forward flight, the projected wing area of aft wings 82 and 84 is greater than the projected wing area of fore wings 78 and 80.

Figure 10:
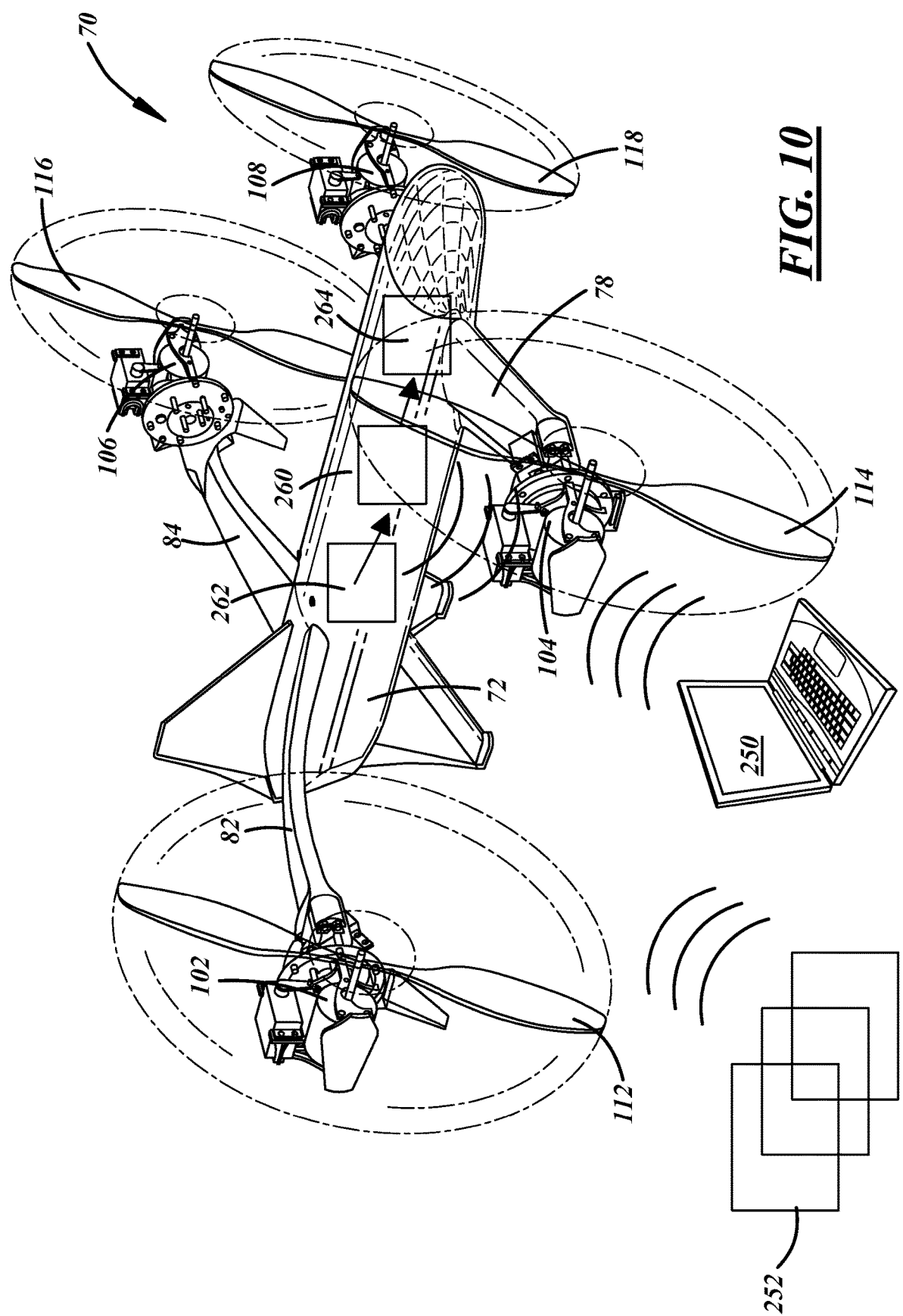
FIG. 10 is a schematic of the electronics controls on the aeronautical apparatus.

Referring now to FIG. 10, the basics of the control hardware is shown for drone 70. A laptop or other device 250 may be used to provide a desired route before taking off or an updated route while in flight (such as real-time control). Device 250 may be communicating wirelessly through Bluetooth (when in range), radio, Wi-Fi, or any suitable system. Device 250 may use telephone cellular communication as well. Control of drone 70 may use other sensors 252, such as those that communicate weather information, wind speed, barometric pressure, etc. that can be transmitted wirelessly. Both device 250 and sensors 252 provide input data to electronic control unit (ECU) 260 onboard drone 70. In other alternatives, the ECU can be located remotely. ECU 260 is provided sensor data from a host of sensors 262 based on output from one or more of sensors detecting: air speed, ground speed, radar altimeter, barometric pressure, thermometer, magnetometer, global position, accelerometer, gyroscope, radar, LIDAR, sonar, infrared camera, visible wavelength camera, energy consumption rate, energy generation rate, and battery charge state. Based on the desired trajectory and the information from a plethora of sensors 262, ECU 260 determines what to command to the various motors: thrust-angle motors (not visible) to control the propellers' 112, 114, 116, and 118 and propeller motors' 102, 104, 106 and 108 thrust-angle positions at the tips of the wings 82, 78, 84 and 80 (wing 80 not visible in FIG. 10; refer to FIG. 9 to see wing 80) respectively, and propeller-pitch motors (not visible) and propeller motors 102, 104, 106 and 108 to control the thrust produced by each of the propellers 112, 114, 116, and 118, respectively. ECU 260 provides control signals 264 to the various motors. In some embodiments, ECU 260 includes motor drivers with sufficient current capability to drive the motors. In some embodiments, ECU 260 simply provides control signals that are sent to motor drivers which are electrically coupled to the motors. ECU 260 may communicate back to device 250 to provide images or other information, such as the state of battery charge.

It is desirable to have the ability to extend the thrust-angle position's range somewhat beyond the thrust-angle base positions shown in FIG. 9 (hovering thrust-angle base position) and FIG. 10 (translational thrust-angle base position) for control purposes. Approximately 10 degrees of additional thrust-angle control position near each end of travel allows the aeronautical apparatus to be controllable about the yaw axis and longitudinal direction while hovering (i.e. thrust-angle motors are substantially in the hovering thrust-angle base position) and controllable about the roll and pitch axes while in translational flight (i.e. thrust-angle motors are substantially in the translational flight thrust-angle base position).

Figure 11:
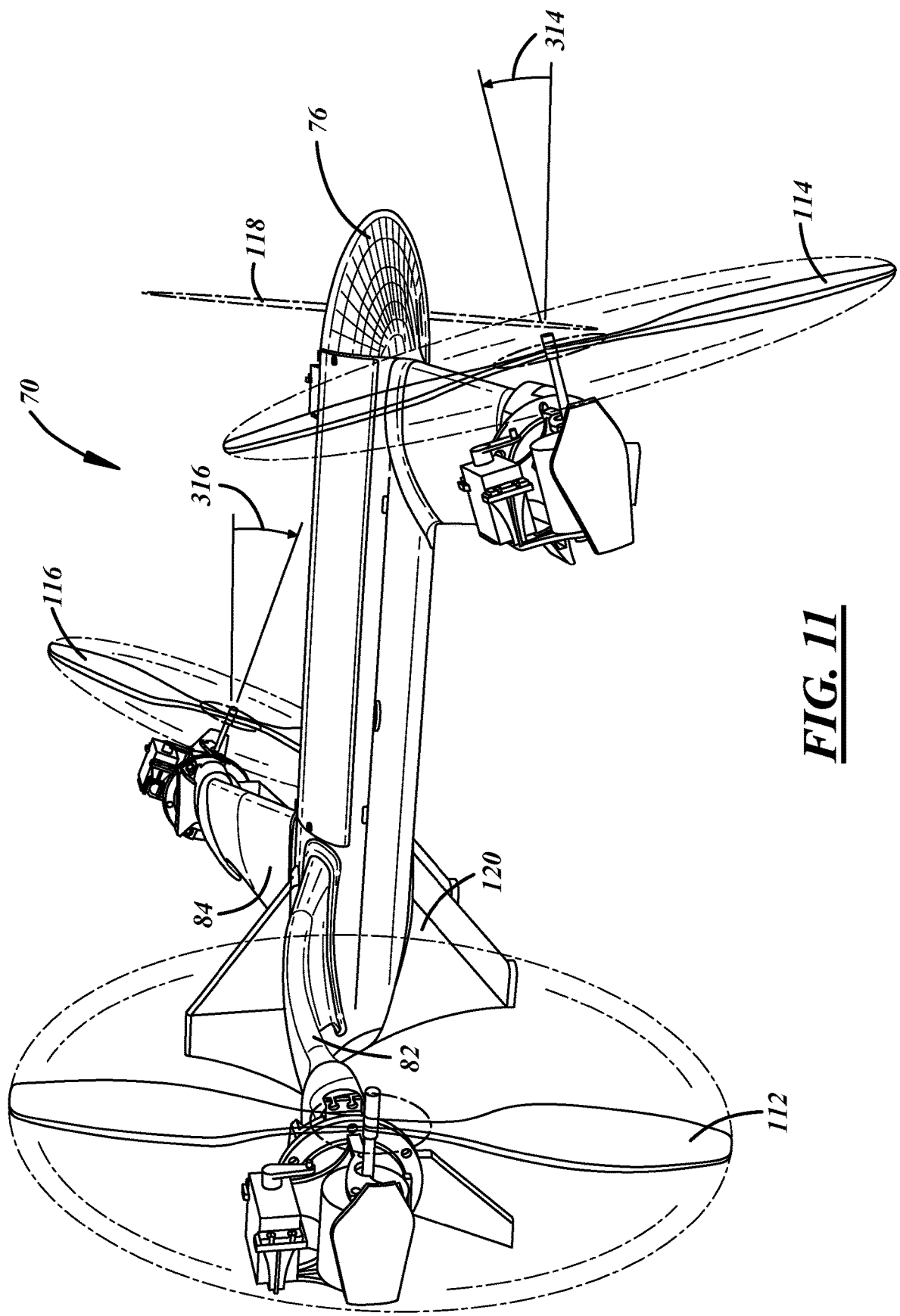
FIGS. 11 and 12 are examples of two combinations of thrust-angle positions for two specific maneuvers of the aeronautical apparatus.

In FIG. 11, one example of many possible combinations of thrust-angle positions is shown that causes drone 70 to undergo a maneuver. As shown in FIG. 11, drone 70 is in a level transitional attitude. Propellers 112 and 118 are in a translational thrust-angle base position with no thrust-angle control position, i.e., with an axis of rotation parallel to longitudinal axis 74. Propeller 114 is rotated backward, i.e., the axis of rotation is displaced from being parallel to the longitudinal axis by a thrust-angle control position denoted by 314. Propeller 116 is rotated forward, i.e., the axis of rotation is displaced from being parallel to the longitudinal axis by a thrust-angle control position denoted by 316. Drone 70 rolls left and pitches upward in response to the propellers being at the thrust-angle positions shown in FIG. 11. In some embodiments thrust-angle control positions 314 and 316 may be equal to each other in magnitude.

Figure 12:
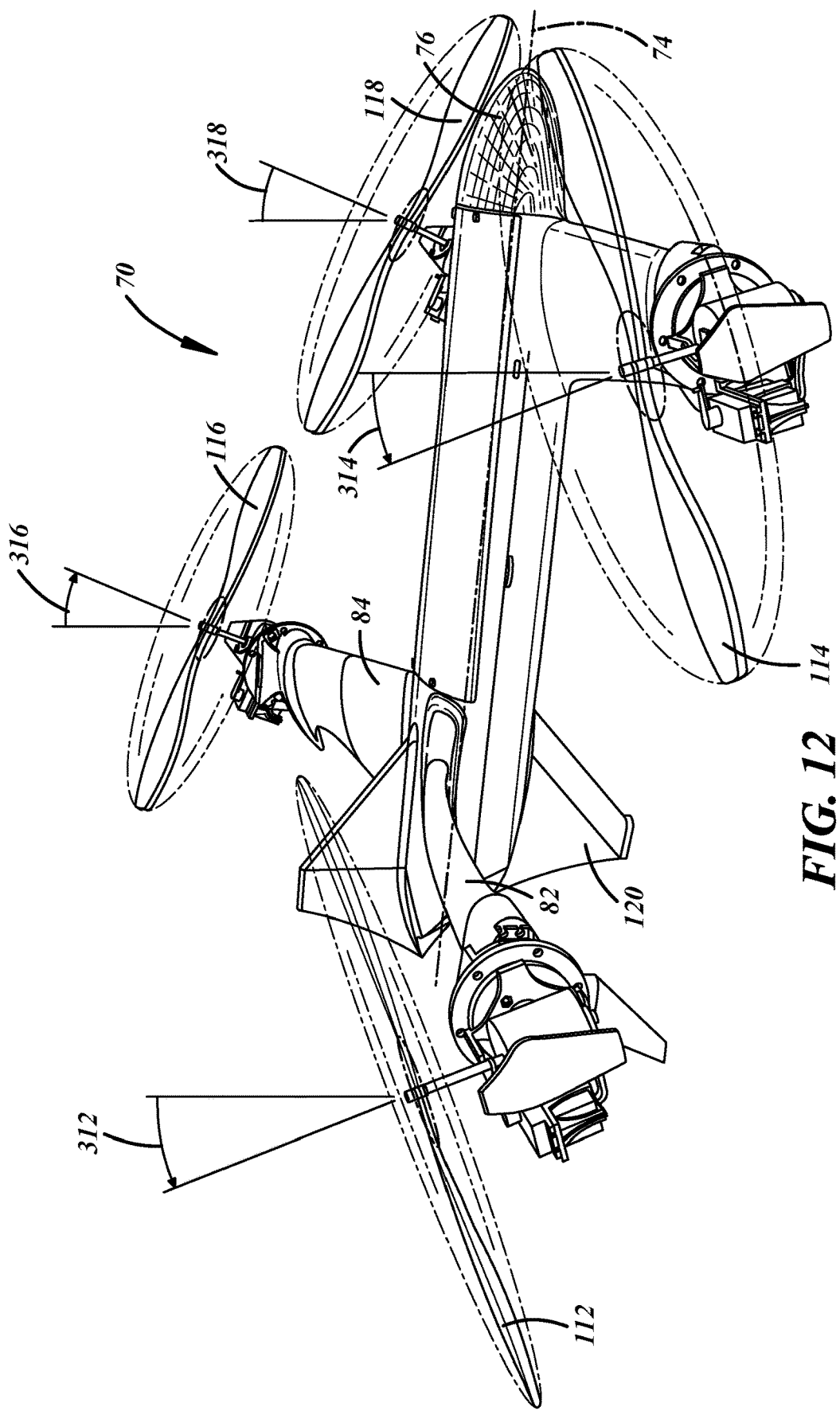

In FIG. 12, another example combination of thrust-angle positions is shown. When hovering, all of propellers 112, 114, 116, and 118 have a thrust-angle base position such that their axes of rotation are perpendicular to longitudinal axis 74 and parallel to the direction of gravity in level flight (should no thrust-angle control positions be present). In FIG. 12, propellers 112 and 114 are rotated backward by thrust-angle control positions 312 and 314, respectively, from the hovering thrust-angle base position. Propellers 116 and 118 are rotated forward by thrust-angle control positions 316 and 318, respectively, from the hovering thrust-angle base position. Drone 70 yaws to the right in response to the propellers being at the thrust-angle positions shown in FIG. 12. In some embodiments all four of these thrust-angle control positions may be equal to each other in magnitude.

The desired range of authority of thrust-angle motors is greater than the range between the hovering thrust-angle base positions and the translational thrust-angle base position (90 degrees). In FIG. 11, the thrust-angle position of propeller 116 is rotated forward from the translational thrust-angle base position to undergo a maneuver. As such the thrust-angle position of propeller 116 causes a slight negative lift, this is not a thrust-angle position that is sustained for a substantial period of time, mainly employed to complete a maneuver. In FIG. 12, another propeller thrust-angle position is shown that is outside of the range between the hovering and translational thrust-angle base positions. In particular, the thrust-angle position of propellers 112 and 114 are rotated backward from the hovering thrust-angle position, which results in the thrust being slightly reversed from the direction of what is normally set for translational flight. Again, some thrust-angle positions that are accessible via thrust-angle motors may be employed for brief periods to cause a particular maneuver. A range of 90 degrees plus at least 10 degrees on each end of the hovering and translational thrust-angle base positions yields a total range of control authority of at least 110 degrees for the thrust-angle motors to provide the desired functionality. The example of 10 degrees of rotation beyond the thrust-angle base hovering and translational positions is not intended to be limiting. Depending on the application, greater or lesser ranges of authority may be desirable. Also, depending on the application, it may be useful to allow a greater range beyond the translational thrust-angle base position than the hovering thrust-angle base position and vice versa in other applications.

While the best configuration has been described in detail with respect to particular embodiments, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, efficiency, strength, durability, life cycle cost, marketability, speed, endurance, range, appearance, packaging, size, serviceability, weight, manufacturability, ease of assembly, etc. The embodiments described herein that are characterized as less desirable than other embodiments or prior-art implementations with respect to one or more characteristics are not outside the scope of the disclosure and may be desirable for particular applications.

We claim:

1. An aeronautical apparatus, comprising:
a fuselage having a longitudinal axis and a traverse axis;
a first wing coupled to a right side of the fuselage;

a second wing coupled to a left side of the fuselage;

first and second thrust-angle motors having an axis of rotation substantially parallel to a transverse axis of the fuselage with the first and second thrust-angle motors coupled to a tip of the first and second wings, respectively;

a first propeller motor coupled to the first thrust-angle motor;

a second propeller motor coupled to the second thrust-angle motor;

a first propeller coupled to the first propeller motor;

a second propeller coupled to the second propeller motor; and at least one stabilizer coupled at the aft of the fuselage and extending downwardly from the fuselage, wherein:

the axis of rotation of the first propeller motor is configured to change in response to rotation of the first thrust-angle motor; and the axis of rotation of the second propeller motor is configured to change in response to the rotation of the second thrust-angle motor.

2. The aeronautical apparatus of claim 1, further comprising:

a third propeller motor coupled to the fuselage; and a third propeller coupled to the third propeller motor.

3. The aeronautical apparatus of claim 1, further comprising:

an electronic control unit (ECU) in electronic communication with: the first and second thrust-angle motors and the first and second propeller motors, wherein the ECU commands: thrust-angle positions to the first and second thrust-angle motors; a first propeller speed to the first propeller motor; a second propeller speed to the second propeller motor; and the first propeller speed and the second propeller speed are unequal.

4. The aeronautical apparatus of claim 3, further comprising:

a plurality of sensors in electronic communication with the ECU wherein the ECU commands to the first and second thrust-angle motors and the first and second propeller motors are further based on data from the plurality of sensors.

5. The aeronautical apparatus of claim 1, further comprising:

a third wing coupled to the right side of the fuselage;

a fourth wing coupled to the left side of the fuselage;

third and fourth thrust-angle motor having an axis of rotation substantially parallel to the transverse axis of the fuselage with the third and fourth thrust-angle motors coupled proximate a tip of the third and fourth wings, respectively;

a third propeller motor coupled to the third thrust-angle motor;

a fourth propeller motor coupled to the fourth thrust-angle motor;

a third propeller coupled to the third propeller motor; and a fourth propeller coupled to the fourth propeller motor.

6. The aeronautical apparatus of claim 1, wherein;

the first wing is angled downward with anhedral;

the second wing is angled downward with anhedral;

the third wing is angled upward with dihedral;

the fourth wing is angled upward with dihedral;

the first and second wings are at the same axial location along the fuselage;

the third and fourth wings are at the same axial location along the fuselage; and the axial location of the third and fourth wings is behind that of the first and second wings.

7. The aeronautical apparatus of claim 1, further comprising:

an electronic control unit (ECU) in electronic communication with: the first, second, third and fourth thrust-angle motors and the first, second, third and fourth propeller motors wherein:

the ECU determines desired first, second, third, and fourth thrust-angle positions for the first, second, third, and fourth thrust-angle motors, respectively, based at least on a desired trajectory;

the ECU commands the first, second, third, and fourth thrust-angle motors to attain their respective desired thrust-angle positions;

the ECU determines desired first, second, third, and fourth propeller speeds based at least on the desired trajectory; and the ECU commands the first, second, third, and fourth propeller motors to attain the desired first, second, third, and fourth propeller speeds, respectively.

8. The aeronautical apparatus of claim 7 wherein:

the ECU determines actual trajectory of the aeronautical apparatus based on data from a sensor;

the ECU determines desired trajectory of the aeronautical apparatus based on at least one input signal;

the ECU commands to the first, second, third, and fourth thrust-angle motors and the first, second, third, and fourth propeller motors are based on the actual trajectory and the desired trajectory; and the sensor comprises at least one of: air speed, ground speed, radar altimeter, barometric pressure, thermometer, magnetometer, global position, accelerometer, gyroscope, radar, LIDAR, sonar, infrared camera, visible wavelength camera, energy consumption rate, energy generation rate, and battery charge state; wherein:

the first and second propeller speeds are different.

9. The aeronautical apparatus of claim 5, further comprising:

an electronic control unit (ECU) wherein;

at least two of the first, second, third, and fourth propellers are variable pitch propellers having propeller-pitch motors coupled to the propeller;

the ECU is in electronic communication with the propeller-pitch motors;

the ECU determines a desired first and second propeller-pitch angle based at least on a desired trajectory; and the ECU commands the first and second propeller-pitch motors to attain their respective propeller-pitch angles.

10. The aeronautical apparatus of claim 5 wherein at least two of the first, second, third, and fourth wings are unitary.

11. An aeronautical apparatus, comprising: a fuselage having a longitudinal axis and a transverse axis; first and second wings attached to a right side of the fuselage; third and fourth wings attached to a left side of the fuselage;

first, second, third, and fourth thrust-angle motors attached to the first second, third, and fourth wings, respectively;

first, second, third, and fourth propeller motors attached to the first, second, third, and fourth thrust-angle motors, respectively; and first second, third, and fourth propellers attached to the first, second, third, and fourth propeller motors, respectively wherein the first, second, third and fourth thrust-angle motors have axes of rotation substantially parallel to the transverse axis of the fuselage.

12. The aeronautical apparatus of claim 11 wherein the first, second, third, and fourth thrust-angle motors have a range of at least 110 degrees about the thrust-angle motor's axis of rotation.

13. The aeronautical apparatus of claim 11, further comprising:
an electronic control unit (ECU) in electronic communication with the first, second, third and fourth thrust-angle motors wherein:
the ECU determines desired first, second, third, and fourth thrust-angle positions for the first, second, third, and fourth thrust-angle motors, respectively, based at least on a desired trajectory; and
the ECU commands the first, second, third, and fourth thrust-angle motors to attain the desired first, second, third, and fourth thrust-angle positions, respectively.

14. The aeronautical apparatus of claim 11, further comprising:
an electronic control unit (ECU) in electronic communication with the first, second, third, and fourth propeller motors wherein:
the ECU determines desired first, second, third, and fourth propeller speeds for the first, second, third, and fourth propeller motors, respectively, based at least on a desired trajectory; and
the ECU commands the first, second, third, and fourth propeller motors to attain the desired first, second, third, and fourth propeller speeds, respectively.

15. The aeronautical apparatus of claim 13 wherein:
the ECU is in electronic communication with the first second, third, and fourth propeller motors;
the ECU bases the desired first, second, third, and fourth thrust-angle positions and determines a desired first, second, third, and fourth propeller speeds on data from sensors;
the desired first and third propeller speeds are different from each other; and
the sensors comprise at least one of: air speed, ground speed, radar altimeter, barometric pressure, thermometer, magnetometer, global position, accelerometer gyroscope, radar, LIDAR, sonar, infrared camera, visible wavelength camera, energy consumption rate, energy generation rate, and battery charge state.

16. The aeronautical apparatus of claim 15 wherein:
at least two of the propellers are variable pitch propellers having propeller-pitch motors;
the ECU is in electronic communication with the propeller-pitch motors;
the ECU determines desired propeller-pitch angles based at least on a desired trajectory; and
the ECU commands the propeller-pitch motors to attain the desired propeller-pitch angles.

17. The aeronautical apparatus of claim 11, further comprising:
a fixed stabilizer extending downwardly from the fuselage.

18. The aeronautical apparatus of claim 11, wherein:
the first and third wings are fore wings;
the second and fourth wings are aft wings;
the first and third wings are angled downward with anhedral; and
the second and fourth wings are angled upward with dihedral.

19. An aeronautical apparatus, comprising:
a fuselage having a longitudinal axis and a transverse axis; first and second wings attached to a right side of the fuselage; third and fourth wings attached to a left side of the fuselage; first, second, third, and fourth thrust-angle motors attached to the tips of the first second, third, and fourth wings, respectively, with the first, second, third, and fourth thrust-angle motors having axes of rotation substantially parallel to the transverse axis of the fuselage;
first, second, third, and fourth propeller motors attached to the first, second, third, and fourth thrust-angle motors, respectively, with the first, second, third, and fourth propeller motors having axes of rotation substantially parallel to the longitudinal axis of the fuselage; and
a stabilizer extending downwardly from the fuselage.

20. The aeronautical apparatus of claim 19, wherein:
the first and third wings are fore wings;
the second and fourth wings are aft wings;
the first and third wings are angled downward with anhedral; and
the second and fourth wings are angled upward with dihedral.

* * * * *